（12） United States Patent
Kamakura et al.

(10) Patent No.: US 8,588,615 B2
(45) Date of Patent: Nov. 19, 2013

(54) OPTICAL COMMUNICATION CARD AND COMMUNICATION DEVICE

(75) Inventors: Masafumi Kamakura, Yokohama (JP); Koji Takatori, Tokyo (JP); Yasuyuki Fukashiro, Yokohama (JP); Tetsuya Uda, Yokohama (JP); Hidemasa Narita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 299 days.

(21) Appl. No.: 12/987,745

(22) Filed: Jan. 10, 2011

(65) Prior Publication Data

US 2011/0176812 A1    Jul. 21, 2011

(30) Foreign Application Priority Data

Jan. 20, 2010   (JP) ................................. 2010-009628

(51) Int. Cl.
    *H04B 10/40* (2013.01)
(52) U.S. Cl.
    USPC ........................................................ 398/115
(58) Field of Classification Search
    USPC ................................................ 398/115–118
    See application file for complete search history.

(56) References Cited

U.S. PATENT DOCUMENTS

| 7,139,271 | B1 | 11/2006 | Parruck et al. |
| 7,236,488 | B1 | 6/2007 | Kavipurapu |
| 2006/0120718 | A1 | 6/2006 | Natori |
| 2006/0165417 | A1 | 7/2006 | Hsieh |
| 2007/0237452 | A1 | 10/2007 | Truong |
| 2008/0131118 | A1* | 6/2008 | Chiang .......................... 398/45 |
| 2009/0175289 | A1* | 7/2009 | Heston et al. ................. 370/419 |

FOREIGN PATENT DOCUMENTS

| JP | 2000-224256 A | 8/2000 |
| JP | 2006-041921 | 2/2006 |
| JP | 2006-166037 | 6/2006 |

OTHER PUBLICATIONS

Chao, Jonathan H.; Next Generation Routers; Proceedings of the IEEE, vol. 90, No. 9, Sep. 2002; pp. 1518-1558.
Shaw, Wei-Tao, et al.; Hybrid Architecture and Integrated Routing in a Scalable Optical—Wireless Access Network; Journal of Lightwave Technology, vol. 25, No. 11, Nov. 2007; pp. 3443-3451.
European Patent Office extended search report on application No. 11151311.5 dated May 16, 2011; 7 pages.
Office Action received in Japanese Patent Application No. 2010-009628, dated Sep. 3, 2013.

* cited by examiner

*Primary Examiner* — Leslie Pascal
(74) *Attorney, Agent, or Firm* — Foley & Lardner LLP (57) ABSTRACT

Multiplexing-technology based large-capacity transmission requires the installation of many types of interface card. In addition, supporting a redundant configuration for preventing data communication from being interrupted requires the devices and cards more than double those required for the production system. An optical communication card includes multiple optical signal transmission/reception units, main signal processing units corresponding to the optical signal transmission/reception units and required for a multiplexed system, and a connection selection unit that can switch among multiple optical transmission lines, and each of the main signal processing units includes multiple function units and a function selection unit.

9 Claims, 8 Drawing Sheets

OPTICAL COMMUNICATION CARD AND COMMUNICATION DEVICE

BACKGROUND OF THE INVENTION

The present invention relates to an optical communication card having multiple functions and to a communication device.

The recent widespread use of the optical communication technology in various fields, such as the Internet and optical phones, requires an optical transmission system to have an extended, long transmission path and a large-capacity transmission capability. A variety of optical communication cards are required to implement these requirements.

In general, the optical switch function, capable of directly path-switching a large capacity of optical signals, is efficient on a transmission line. In a long-distance transmission system, the longer the propagation distance becomes, the more data errors are generated during signal propagation. To solve this problem, the error correction function, called the FEC (Forward error correction) function, is provided to allow the receiving side to correct data without retransmitting the data even if a data error is generated, thereby implementing optical transmission in a long-distance communication.

An increase in the transmission capacity is implemented by the multiplexing technology such as a time-division multiplexing device or a wavelength-division multiplexing device and, today, an optical transmission system having the transmission capacity of 40 Gbps or 100 Gbps has been developed. However, a time-division multiplexing device and a wavelength-division multiplexing device are installed independently and so there is a need for a layer integration device having various functions for reducing the capital investment.

In general, the layer integration device described above comprises a transponder card having the function to connect to an opposed device, the wavelength conversion function, and the FEC function; and a wavelength multiplexing card having the wavelength multiplexing function. The layer integration device further comprises a switch card having the de-multiplexing function necessary for a time-division multiplexing device; and an interface card connected to the switch card and to the opposed device. In the conventional configuration, the signal accepted by the interface card is transmitted to the switch card and is de-multiplexed by the switch card and, after being cross-connected, the signal is multiplexed again and is transmitted to another interface card. This configuration requires many types of communication cards. For example, JP-A-2006-166037 describes the configuration in which there is an optical switch circuit between the optical transmitter/receiver and multiple transponders and, in addition, multiple cards are required according to a difference in the switching method. In addition, such a configuration requires a communication carrier to provide a redundant configuration to avoid an interruption in the data transmission. To solve this problem, device duplication, or card configuration duplication described in JP-A-2006-41921, is employed to implement a redundant configuration in both the client side (user side) and the line side (provider side).

SUMMARY OF THE INVENTION

Although the function processed by the transponder card and the function processed by the interface card are similar, the conventional layer integration device must have both cards. To allow both cards to share the function, the layer integration device must have a backplane installed therein for communication via the back plane, making the configuration complex.

Another problem is that the need for device duplication and card duplication for building a redundancy configuration requires a communication carrier to make a two-fold investment.

In view of the foregoing, there is a need for a layer integration device to automatically recognize the settings specified by a maintenance engineer and the signals received by the device for providing various services and to ensure redundancy and expandability while still allowing a single card to provide multiple functions.

To solve the problems described above, multiple signal transmission/reception units (main signal transmission/reception units) each having the optical signal transmission and reception function and multiple main signal processing units each capable of selecting the transponder function, interface function, and so on are installed on a communication card. Multiple signal processing units may be connected in the card or may be connected to a signal processing unit on another card.

For example, when one signal processing unit performs the accommodation signal processing function, another signal processing unit performs the FEC processing function, and the two main signal processing units may be connected via the connection selection unit, this configuration allows a transponder to be built with a single communication card. In addition, when one main signal processing unit performs the accommodation signal processing function, another two main signal processing units perforin the FEC processing function, and the three main signal processing units are connected via the connection selection unit, redundancy may be introduced into the FEC processing function on a single communication card. Multiple communication cards, if installed in the device, allow the interface configuration across the communication cards.

An example of a communication card of the present invention is an optical communication card comprising a first signal transmission/reception unit that performs optical-electrical signal conversion for a signal received from an external unit to generate a first signal; a second signal transmission/reception unit that performs optical-electrical signal conversion for a second signal and transmits the converted signal to an external unit; a first signal processing unit that comprises a plurality of types of function units and a function selection unit that selects a function unit to be operated from the plurality of types of function units and that is connected to the first signal transmission/reception unit to process the first signal; a second signal processing unit that comprises a plurality of types of function units and a function selection unit that selects a function unit to be operated from the plurality of types of function units and that is connected to the second signal transmission/reception unit to process the second signal; and a connection selection unit that manages a connection between the first signal processing unit and the second signal processing unit.

An example of a communication device of the present invention is a communication device that has a communication card and a control unit that controls the communication card wherein the communication card comprises a first signal transmission/reception unit that performs optical-electrical signal conversion for a signal received from an external unit to generate a first signal; a second signal transmission/reception unit that performs optical-electrical signal conversion for a second signal and transmits the converted signal to an external unit; a first signal processing unit that comprises a plurality of types of function units and a function selection unit that selects a function unit to be operated from the plurality of types of function units and that is connected to the first signal transmission/reception unit to process the first signal; a second signal processing unit that comprises a plurality of types of function units and a function selection unit that selects a function unit to be operated from the plurality of types of function units and that is connected to the second signal transmission/reception unit to process the second signal; a connector that transmits the first signal to a backplane; and a connection selection unit that manages a connection between one of the second signal processing unit and the connector and the first signal processing unit, and the control unit transmits control information on the connection to the connection selection unit. The communication device may comprise multiple communication cards and a switch that controls the connection among the multiple communication cards.

Layer integration implemented on a single card ensures redundancy and expandability while providing multiple functions. This capability lowers the cost of the layer integration device. Signal processing functions corresponding to various needs may be set on a single card arbitrarily by selecting the maintenance/management method from the setting device of an external terminal or by automatically judging accommodation signals. A maintenance engineer, who maintains the device, selects the transponder or interface configuration via the setting device to set up any configuration on a single card. When a redundant configuration is required, one of the multiple main signal transmission/reception units is selected as the client side and a main signal transmission/reception unit other than the one is selected as the client side is selected as the line side in a single card and, among the main signal processing units corresponding to the main signal transmission/reception units, the main signal processing unit corresponding to the client side and the main signal processing unit corresponding to the line side are arbitrarily connected by the connection selection unit to build a redundant configuration. This configuration reduces the card types a carrier must install and, in addition, allows a redundant configuration to be built with a signal card, significantly reducing the communication carrier's capital investment.

Other objects, features and advantages of the invention will become apparent from the following description of the embodiments of the invention taken in conjunction with the accompanying drawings.

DETAILED DESCRIPTION OF THE EMBODIMENTS

An optical transmission system using an optical communication card of the present invention will be described below. Note that the present invention is not limited by the embodiment described blow.

Figure 3:
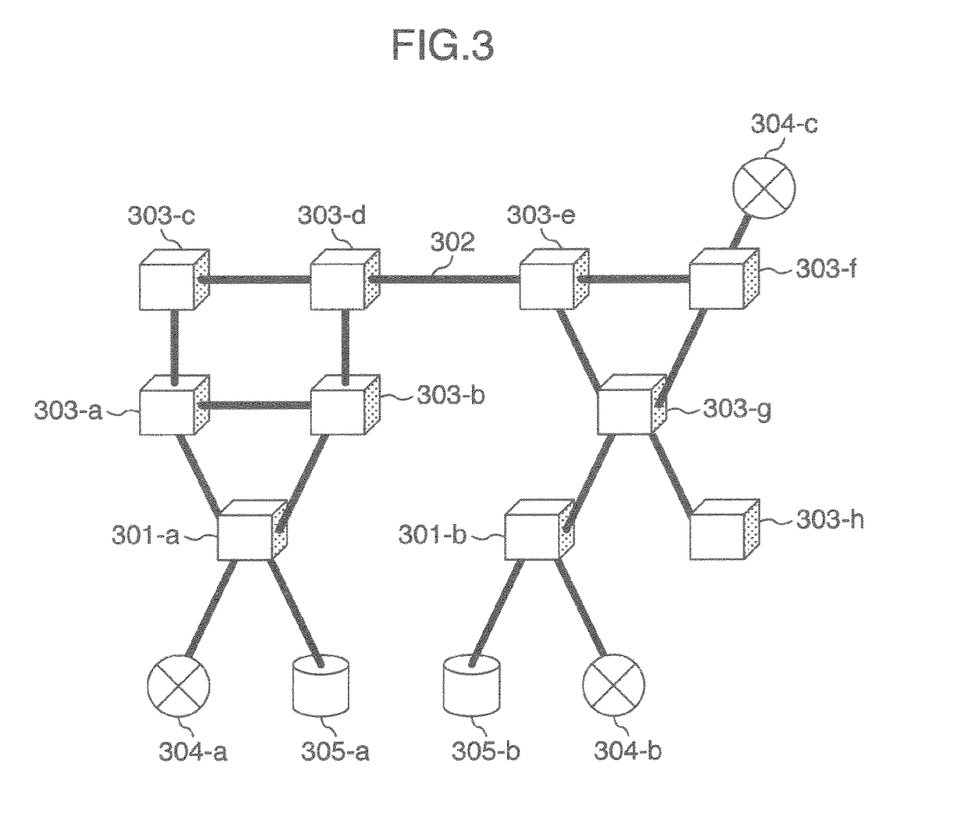
FIG. 3 is a diagram showing an example of the general configuration of a network to which a layer integration device is applied.

FIG. 3 is a diagram showing an example of the configuration of an optical communication network to which a layer integration device of this embodiment is applied. Installing a layer integration device 301 (301-*a*, 301-*b*), which has an optical communication card, in an optical communication network, composed of an optical network fiber 302 and an optical transmission device 303, allows a different-layer communication network, such as a router 304 and an SDH device 305, to be included in a conventional optical communication network.

Figure 1:
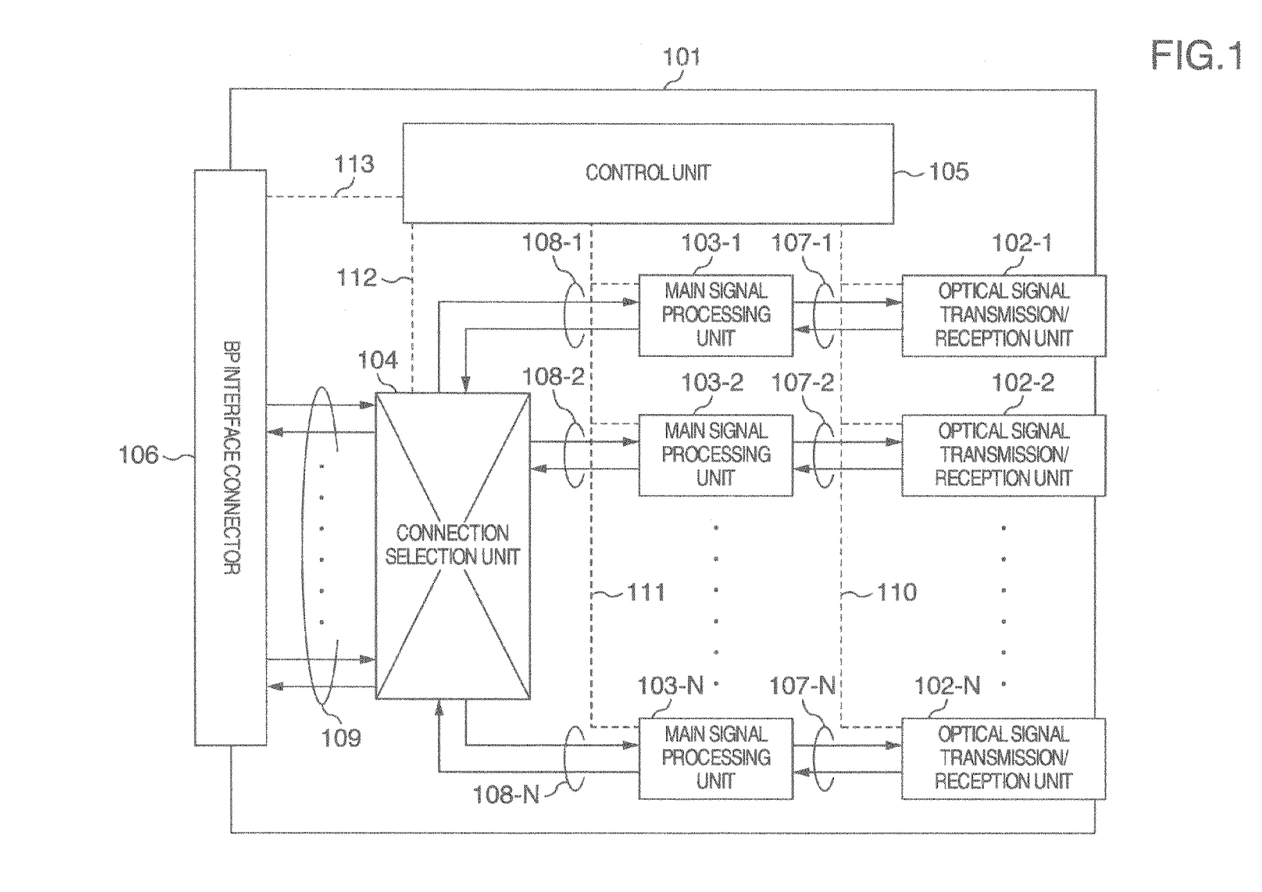
FIG. 1 is a diagram showing an example of the configuration of an optical communication card.
Figure 2:
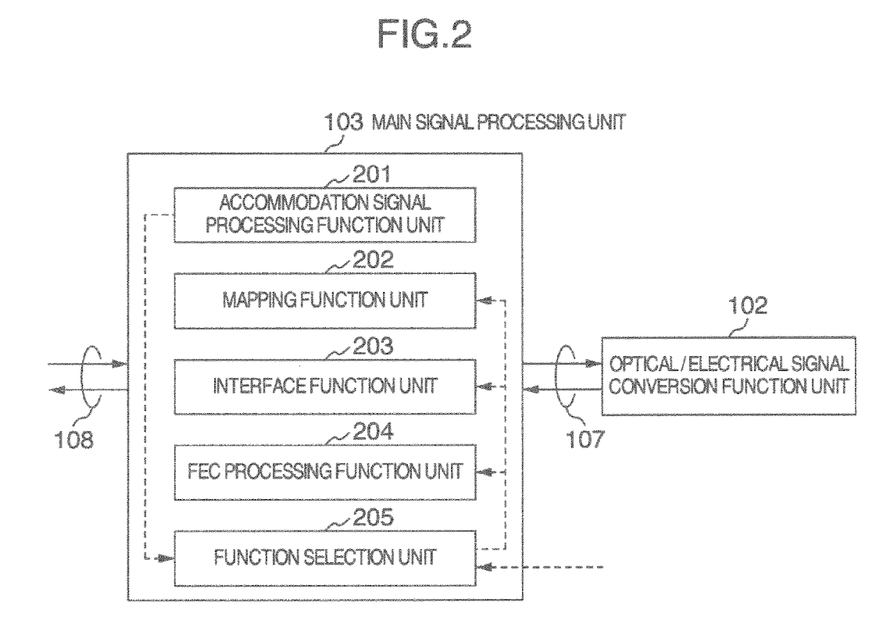
FIG. 2 is a diagram showing an example of the functional blocks of a main signal processing unit installed in the optical communication card.

FIG. 1 is a configuration diagram and a functional block diagram of the optical communication card in this embodiment FIG. 2 is a functional block diagram of a main signal processing unit. An optical communication card 101 shown in FIG. 1 has multiple optical signal transmission/reception units 102 (102-1-102-N). The optical signal transmission/reception unit 102 has the conversion function to convert an optical signal and an electrical signal, and each optical signal transmission/reception unit 102 has a transmission unit and a reception unit. The optical communication card 101 further comprises main signal processing units 103 (103-1-103-N), one for each optical signal transmission/reception unit 102 (102-1-102-N). As shown in FIG. 2, the main signal processing unit 103 comprises an accommodation signal processing function unit 201 that monitors and supervises an accommodation signal; a mapping function unit 202 that converts a received signal to a different-protocol signal for conversion to multiple types of protocol; an interface function unit 203 that has the interface function; an FEC processing function unit 204 that processes Forward Error Correction for correcting data errors; and a function selection unit 205 that selects a function inside the device. All function units need not be provided but a part of them may be included in the configuration. And, when the maintenance engineer specifies settings or when the device automatically makes judgment based on the accommodation signal, the function operation of each function unit is implemented. The optical communication card 101 further comprises a connection selection unit 104 that selects a path freely in the card; and a backplane (hereinafter called BP) interface connector 106 that communicates with a unit outside the card. Among the function units are provided main signal transmission lines 107, 108, and 109 through which the main signal propagates. The optical communication card 101 further comprises a control unit 105 that manages the usage status information on the main signal transmission/reception units based on the control information, which will be described later, and the in-card connection setting information such as the configuration information on the connection among the main signal processing units, transmits and receives control information to and from the elements (main signal transmission/reception units, main signal processing units, etc.) in the optical communication card, and transmits an alarm to an external device when an abnormal condition is generated in each element; and control signal transmission lines 110, 111, 112, and 113 for propagate control signals.

Figure 4:
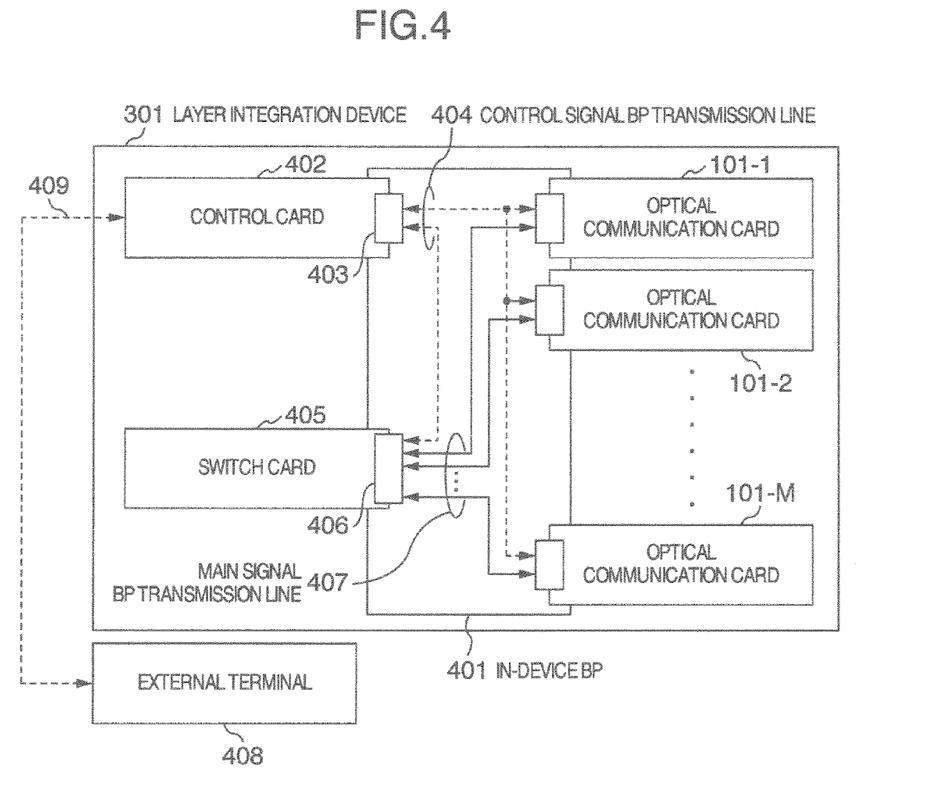
FIG. 4 is a diagram showing an example of the general configuration of the layer integration device.

FIG. 4 is a diagram showing the configuration of the layer integration device in this embodiment. The layer integration device 301, which has an in-device BP 401 that allows communication among various cards, may include a control card 402, a switch card 405, and optical communication cards 101 (101-1-101-N) in this embodiment. The in-device BP 401 comprises a control signal BP transmission line 404 for propagating a control signal between the control card 402 and each card; and a main signal BP transmission line 407 for propagating a main signal between the optical communication cards 101 and the switch card 405. The control card 402 and the switch card 405 have a control card BP interface connector 403 and a switch card BP interface connector 406, respectively, for transmitting and receiving signals to and from the in-device BP 401. From an external terminal 408 to the control card 402 via an external terminal control signal transmission line 409, the maintenance engineer transmits port settings and control information for selecting and executing the transponder function or, via the switch card 405, the interface function. The control information has the information on which of the main signal transmission/reception units is to be allocated to the port of the client side and the line side and on the connection configuration among the ports. This allows the maintenance engineer to freely select the configuration to be used for operation in the layer integration device 301.

Figure 5:
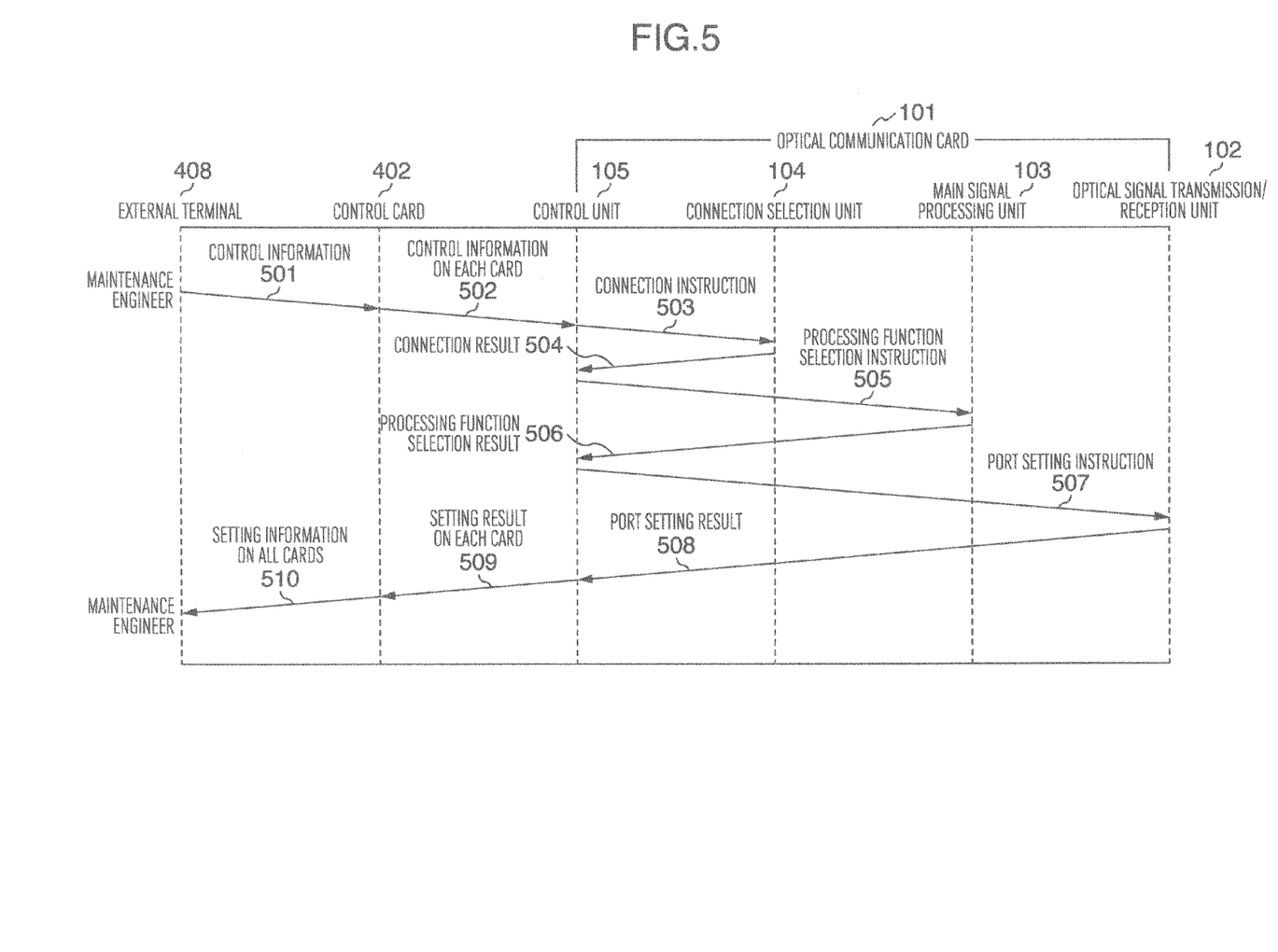
FIG. 5 is a diagram an example of the manual control sequence of the layer integration device.

FIG. 5 is a diagram showing an example of the manual control sequence of the layer integration device performed by the maintenance engineer. When control information 501 is transmitted from the external terminal 408 to the control card 402, the control card 402 transmits control information 502 to the required optical communication card 101 based on the control information 501. The control unit 105 in the optical communication card 101, which has received the control information 502, establishes the connection configuration with one of the main signal processing units 103 or between the main signal processing unit 103 and the BP interface connector 106. Via this connection, a connection is ruction 503 is transmitted to the connection selection unit 104, and the control unit 105 confirms a connection result 504. Next, based on the confirmation by the control unit 105, a signal processing function selection instruction 505 is transmitted to the main signal processing unit 103. After that, the main signal processing unit 103 returns a processing function selection result 506 to the control unit 105, and the control unit 105, which has confirmed the main signal processing function, transmits a port setting instruction 507, which enables the optical signal transmission/reception unit 102, to the optical signal transmission/reception unit 102. The port setting refers to the selection of an available port according to the configuration to be started for operation. For example, a client port and a line port are allocated to free ports. On the other hand, the control unit 105, which has received a port setting result 508, transmits a setting result 509 of the final optical communication card 101 from the control unit 105 to the control card 402 and, in addition, the control card 402 transmits setting information 510 on all cards to the external terminal 408. This allows the maintenance engineer to confirm the operation configuration of the layer integration device 301. The sequence described above allows the configuration of the layer integration device 301 to be set from the external terminal.

Figure 6:
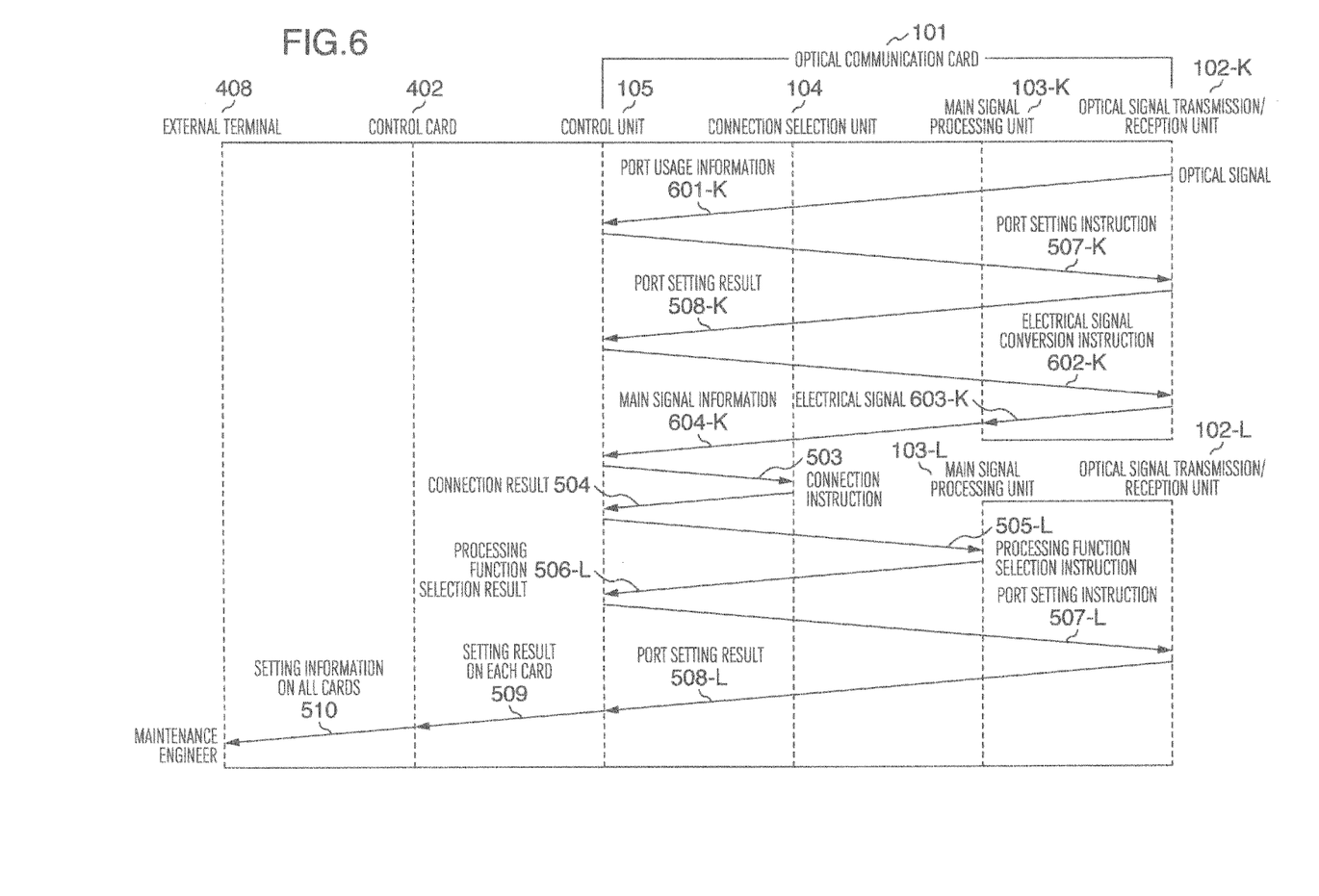
FIG. 6 is a diagram showing an example of the automatic control sequence of the layer integration device.

FIG. 6 is a diagram showing the automatic control sequence of the layer integration device performed through automatic recognition. When one of the optical signal transmission/reception units 102-K in the optical communication card 101 receives an optical signal, port usage information 601-K is transmitted to the control unit 105. The control unit 105 returns a port setting instruction 507-K to perform port setting. In this port setting, a port is selected according to the protocol of the signal to be connected. The control unit 105, which has received a port setting result 508-K, transmits a conversion instruction 602-K, which converts an optical signal to an electrical signal, to the optical signal transmission/reception unit 102-K, which converts the optical signal to an electrical signal 603-K and transmits the converted signal to the main signal processing unit 103-K. The main signal processing unit 103-K transmits main signal information 604-K, included in the electrical signal 603-K, to the control unit 105. The control unit determines the optimal operation configuration method based on the main signal information 604-K. Here, the optimal operation configuration refers to the configuration in which, for a line side port and a client side port to be set based on the control information, the interconnection is determined according to the protocol of the line side port and the protocol of the client side port. For example, the connection ports are decided by connecting the line side port and the client side port when the signal of both sides is transmitted according to the OC-192 protocol or the G-bit Ether protocol, or by selecting a free port if there is no signal and, between them, the transponder is configured. After deciding the optimal configuration, the control unit 105 transmits a connection instruction 503 to the connection selection unit 104. When the connection result 504 is confirmed, the control unit 105 transmits a signal processing function selection instruction 505-L to another main signal processing unit 103-L to be connected. When the processing function selection result 506-L of the main signal processing unit 103-L is confirmed, the control unit 105 transmits a port setting instruction 507-L to the optical signal transmission/reception unit 102-L. After that, the port setting result 508-L is returned to the control unit 105 to automatically establish the connection configuration. When the setting result 509 of the final optical communication card 101 is transmitted from the control unit 105 to the control card 402 and, when the control card 402 transmits the setting information 510 on all cards to the external terminal 408, the maintenance engineer can recognize the operation configuration of the layer integration device 301.

Figure 7:
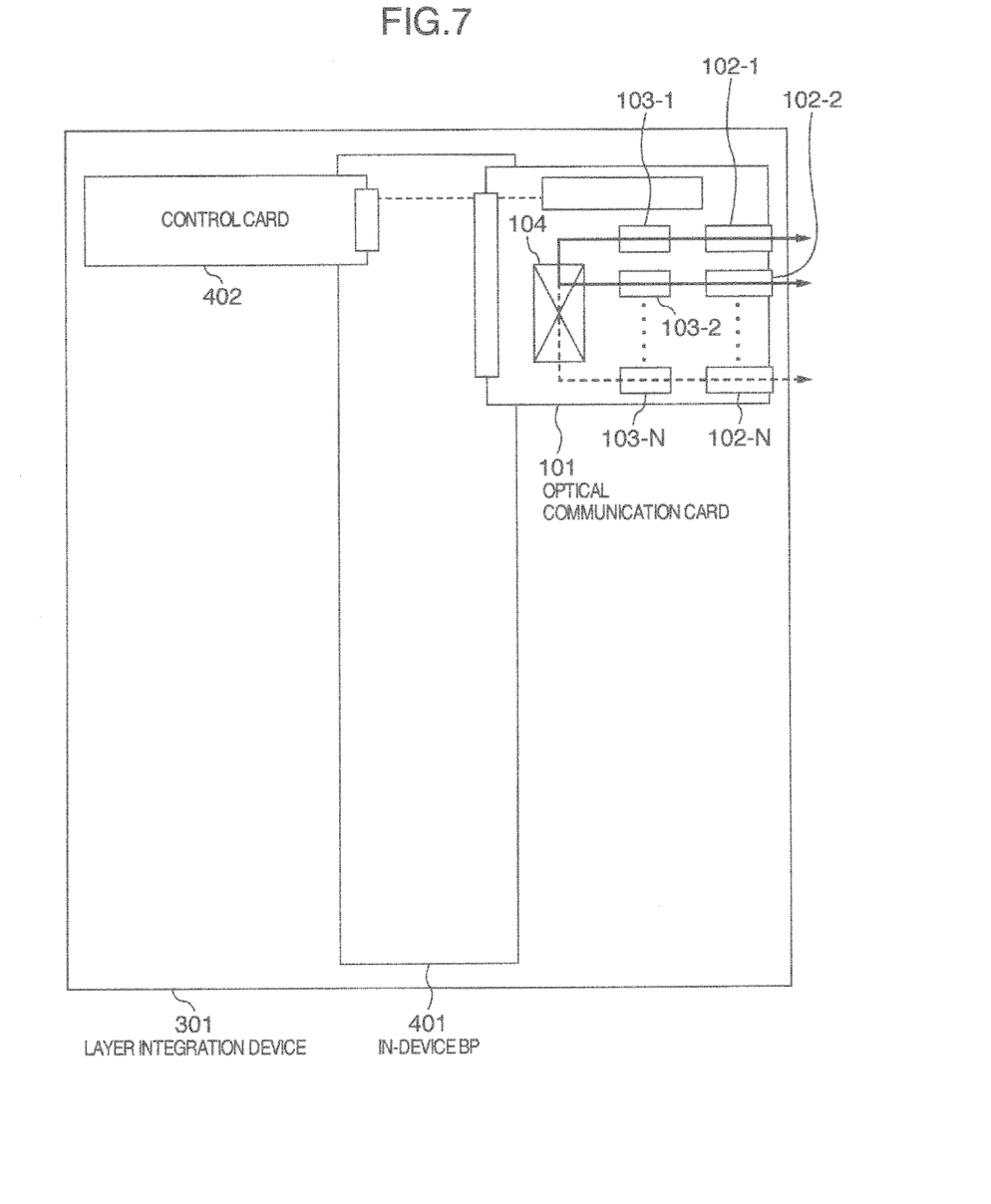
FIG. 7 is a diagram showing an example of the layer integration device configured only by a single optical communication card.

In this embodiment, one of the functions of the main signal processing unit 103 may be selected for operation from the multiple function units of the main signal processing unit by means of the function selection unit to change the processing arbitrarily. FIG. 7 is a diagram showing the layer integration device 301 configured by using one optical communication card 101 in this embodiment. In this configuration, when the client side is allocated to the optical signal transmission/reception unit 102-1 and the line side is allocated to the optical signal transmission/reception unit 102-2, the interface function unit 203 is selected as the function of the main signal processing unit 103-1, and the FEC processing function unit 204 is selected as the function of the main signal processing unit 103-2 manually or automatically and then the main signal processing units are connected by the connection selection unit 104. In this way, the transponder configuration may be implemented in a single card.

In this embodiment, input/output redundancy is also possible even when a single optical communication card 101 is installed in the layer integration device. In FIG. 7, if redundancy is required for the line side, the production system and the backup system may be switched simply by allocating the optical signal transmission/reception unit 102-N to the backup system on the line side, by causing the main signal processing unit 103-N to select the FEC processing function unit 204, and by changing the connection between the main signal processing units by the connection selection unit 104 from the optical signal transmission/reception unit 102-2 to the optical signal transmission/reception unit 102-N. This method allows a redundant configuration to be implemented on both client side and line side. In addition, even when the optical communication card is singly installed in the layer integration device, a switchable, redundant configuration may be implemented by separating the port and the connection configuration on the client side and line side between the production system and the backup system.

Figure 8:
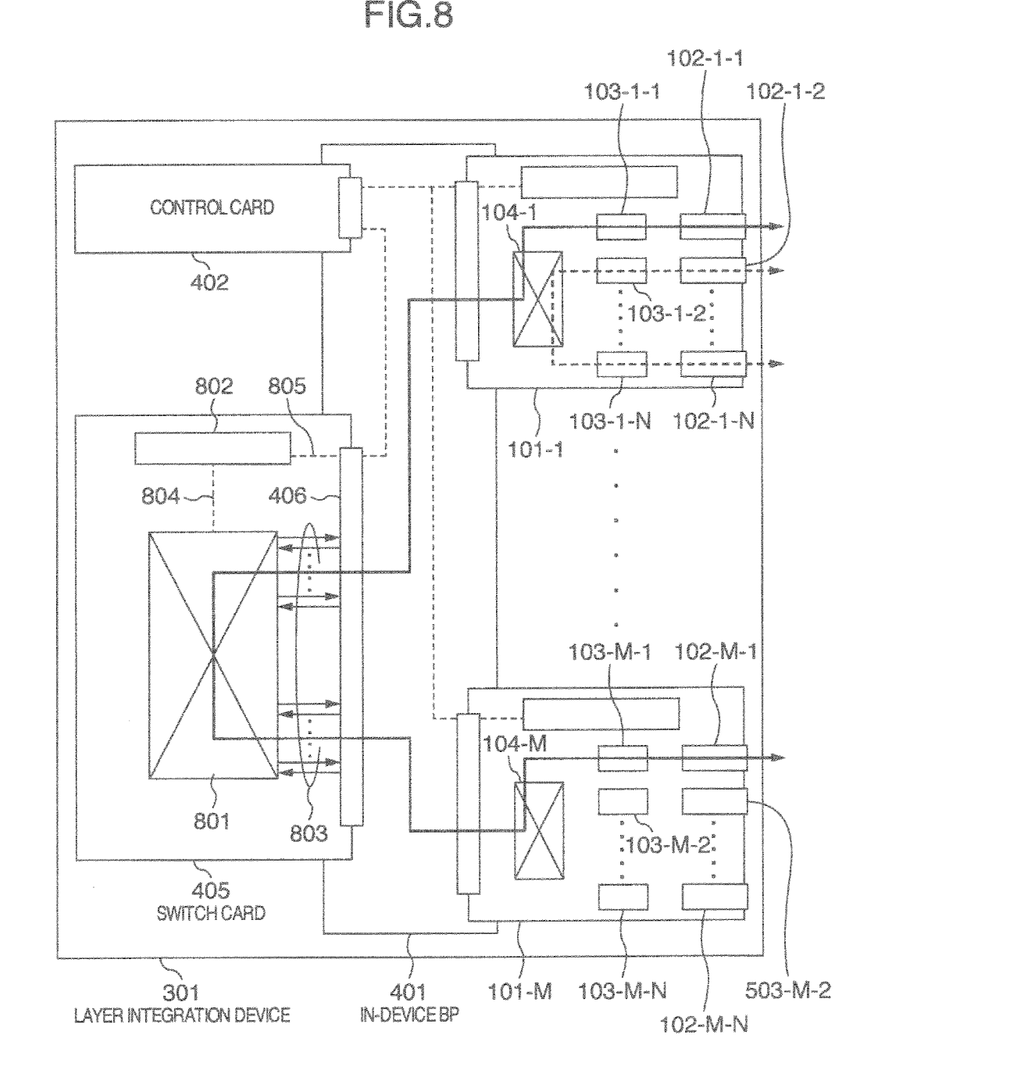
FIG. 8 is a diagram showing an example of the layer integration device configured by two or more optical communication cards and a switch card.

In addition, when multiple optical communication cards are used in this embodiment, the configuration may be selected freely between the multiple cards. FIG. 8 is a diagram showing the layer integration device in which the switch card and multiple optical communication cards are installed. The switch card 405 comprises a large-capacity connection selection unit 801 and a control unit 802 that controls the large-capacity connection selection unit 801, and further comprises main signal transmission lines 803 for propagating the main signal and control signal transmission lines 804 and 805 for propagating the control signals. The following describes a case n which the client side is allocated to the optical signal transmission/reception unit 102-1-1 of the optical communication card 101-1 and the line side is allocated to the optical signal transmission/reception unit 102-M-1 of the optical communication card 101-M in this embodiment as shown in FIG. 8. The transponder configuration is implemented in such a way that the main signal processing unit 103-1-1 selects the interface function, the main signal processing unit 103-1-1 is connected to the BP via the connection selection unit 104-1, the BP is connected to the optical communication card 101-M via the switch card 405, the FEC function is added by the main signal processing unit 103-M-1, and the signal is transmitted to the optical signal transmission/reception unit 102-M-1. In this configuration, even when the functions must be exchanged on a card basis, free ports may be used freely and a redundant configuration may be implemented on a card basis.

The interface function and the transponder function may also be implemented in a single card in this embodiment. In the optical communication card 101-1, the main signal processing unit 103-1-1 implements the interface function and the main signal processing units 103-1-2 and 103-1-N set up the transponder configuration as shown in FIG. 8, thus allowing the multiple-function configuration, which would require multiple cards in the prior art, with a single card.

It should be further understood by skilled in the art that although the foregoing description has been made on embodiments of the invention, the invention is not limited thereto and various changes and modification may be made without departing from the spirit of the invention and the scope of the appended claims.

The invention claimed is:

1. An optical communication card comprising:
a first signal transmission/reception unit configured to perform optical-electrical signal conversion for a signal received from an external unit;
a second signal transmission/reception unit configured to perform optical-electrical signal conversion for a second signal from an internal unit and transmit the converted signal to an external unit;
a first signal processing unit that comprises a plurality of types of function units and a function selection unit configured to select a function unit to be operated from the plurality of types of function units and that is connected to the first signal transmission/reception unit to process a first signal from the first signal transmission/reception unit;
a second signal processing unit that comprises a plurality of types of function units and a function selection unit configured to select a function unit to be operated from the plurality of types of function units and that is connected to the second signal transmission/reception unit to process the second signal for the second signal transmission/reception unit;
a connection selection unit configured to manage a connection between the first signal processing unit and the second signal processing unit;
wherein the plurality of types of function units include at least one of a mapping function unit configured to convert the second signal into a signal of a protocol different from a protocol of the first signal, an interface function unit that has an interface function, and a data correction processing function unit configured to perform data correction;
wherein a transponder is configured in the card when the function selection unit of the first signal processing unit selects the interface function unit as said function unit and the function selection unit of the second signal processing unit selects the data correction processing function unit as said function unit.

2. The optical communication card according to claim 1, further comprising:
a third signal transmission/reception unit configured to transmit and receive a signal to and from an external unit and perform optical-electrical signal conversion for the signal;
a third signal processing unit that is connected to the third signal transmission/reception unit to process the signal from the third signal transmission/reception unit; and
a connector configured to transmit and receive a signal to and from a backplane,
wherein the connection selection unit is configured to select one of the second signal processing unit and the third signal processing unit, and connect the selected signal processing unit to the first signal processing unit and the connector.

3. The optical communication card according to claim 1, wherein
the plurality of types of function units further include
an accommodation signal processing function unit configured to monitor the first signal from the first signal transmission/reception unit,
wherein the function selection unit is configured to select a function unit to be operated from the plurality of types of function units based on a selection notification input from an external unit or a function unit to be operated from the plurality of types of function units based on information included in the first signal from the first transmission/reception unit.

4. The optical communication card according to claim 1, further comprising a control unit configured to manage connection setting information in the optical communication card.

5. A communication device that has a communication card and a control unit configured to control the communication card, wherein the communication card comprises:
a first signal transmission/reception unit configured to perform optical-electrical signal conversion for a signal received from an external unit;

a second signal transmission/reception unit configured to perform optical-electrical signal conversion for a second signal from an internal unit and transmit the converted signal to an external unit;

a first signal processing unit that comprises a plurality of types of function units and a function selection unit configured to select a function unit to be operated from the plurality of types of function units and that is connected to the first signal transmission/reception unit to process a first signal from a first signal transmission/reception unit;

a second signal processing unit that comprises a plurality of types of function units and a function selection unit configured to select a function unit to be operated from the plurality of types of function units and that is connected to the second signal transmission/reception unit to process the second signal to the second signal transmission/reception unit;

a connector configured to transmit the first signal to a backplane; and a connection selection unit configured to manage a connection between one of the second signal processing unit and the connector and the first signal processing unit; and the control unit transmits configured to transmit control information on the connection to the connection selection unit; and wherein the plurality of types of function units include at least one of a mapping function unit configured to convert the second signal into a signal of a protocol different from a protocol of the first signal, an interface function unit that has an interface function, and a data correction processing function unit configured to perform data correction;

wherein a transponder is configured in the card when the function selection unit of the first signal processing unit selects the interface function unit as said function unit and the function selection unit of the second signal processing unit selects the data correction processing function unit as said function unit.

6. The communication device according to claim 5, further comprising:

a switch that has a plurality of the communication cards and configured to control a connection among the plurality of communication cards.

7. The communication device according to claim 5, wherein the control unit is configured to transmit information on a setting of the communication cards to an external terminal.

8. The communication device according to claim 5, wherein the communication card further comprises:

a third signal transmission/reception unit configured to transmit and receive a signal to and from an external unit and perform optical-electrical signal conversion for the signal;

a third signal processing unit that is connected to the third signal transmission/reception unit to process the signal from the third signal transmission/reception unit; and the connection selection unit configured to select one of the second signal processing unit and the third signal processing unit, and connect the selected signal processing unit to the first signal processing unit.

9. The communication device according to claim 5, wherein the plurality of types of function units further include an accommodation signal processing function unit configured to monitor the first signal from the first transmission/reception unit.

* * * * *